United States Patent [19]

Okamoto et al.

[11] Patent Number: 6,156,817
[45] Date of Patent: Dec. 5, 2000

[54] FUNCTIONAL FORM AND PROCESS FOR THE PRODUCTION OF THE SAME

[75] Inventors: Hiroshi Okamoto, Owari-asahi; Shin-ichi Inoue, Tokoname; Kimi Yoshida, Hamamatsu; Hiroki Miyamatsu, Hamamatsu; Masataka Sano, Hamamatsu, all of Japan

[73] Assignee: Kabushiki Kaisha Erubu, Hamamatsu, Japan

[21] Appl. No.: 09/437,572

[22] Filed: Nov. 10, 1999

[30] Foreign Application Priority Data

Nov. 12, 1998 [JP] Japan ................................ 10-321910

[51] Int. Cl.$^7$ ............................ C08K 5/07; C08K 5/13; C08K 3/40
[52] U.S. Cl. ............................ 523/102; 524/58; 524/72; 524/494
[58] Field of Search ............................ 523/102; 524/58, 524/72

[56] References Cited

U.S. PATENT DOCUMENTS 5,888,572   3/1999   Nashimoto et al. .................... 424/405

FOREIGN PATENT DOCUMENTS 7-148407   6/1995   Japan .

*Primary Examiner*—Kriellion Sanders
*Attorney, Agent, or Firm*—Armstrong, Westerman, Hattori, McLeland & Naughton

[57] ABSTRACT

A functional form according to the present invention is disclosed, containing a melt form of a forming resin (Y) compounded with a functional component (a) having antimicrobial properties or deodorizing properties, selected from the group consisting of a catechin, a saponin, a tea-leaf powder, a tea-leaf extract, and tannin (tannic acid), and a ceramics component (b). A process for the production of a functional form is also disclosed, including melt forming a forming resin (Y) compounded with a functional component (a) having antimicrobial properties or deodorizing properties, selected from the group consisting of a catechin, a saponin, a tea-leaf powder, a tea-leaf extract, and tannin (tannic acid), and a ceramics component (b). According to the present invention, the elution of functional components (such as catechins and saponins) can be controlled even after water washing and their functionalities can be maintained (such as antimicrobial properties or deodorizing properties) over a long period of time.

7 Claims, No Drawings

FUNCTIONAL FORM AND PROCESS FOR THE PRODUCTION OF THE SAME

BACKGROUND OF THE INVENTION

1. Field of the Invention

The present invention relates to a functional form capable of controlling the elution of functional components (such as catechins and saponins) even after water washing and of keeping its functionalities (such as antimicrobial properties or deodorizing properties) over a long period of time, and to a process for the production of the same.

2. Description of the Prior Art

As the infiltration of hygienic properties, caring for health attention to environmental improvement, it has become popular to impart antibacterial properties to articles in our immediate life. As bactericides for imparting antibacterial properties, inorganic bactericides containing a silver component and various organic (synthetic or naturally occurring) bactericides are known. However, an attention is being paid to the use of a catechin that is safe, has an antibacterial action and has a deodorizing action, as a bactericide.

In "Popular Science, Science of Teas, First Edition, published on Jun. 10, 1992, pp. 184–185 & pp. 210–211, by Shoka Shobo", it is described that components originated from teas, such as tea catechin, have good antibacterial properties, antiviral properties and deodorizing properties. Also, in "Great Health Power of Green Tea Catechin, First Printing, by Futami Shobo", it is described on different pages that the green tea catechin has superior antibacterial action (including fungicidal action), antiviral action and deodorizing action.

It is also known to use articles having a bactericide compounded therewith (i.e., those having a bactericide internally added thereto or incorporated therein) as a filter of air conditioners or air cleaners. For instance, Japanese Patent Laid-Open No. 99656/1989 mentions an antibacterial electret filter comprising polypropylene fibers having 0.1% or more of a bactericide incorporated therein. However, the bactericide that is used in the examples of this patent publication is thiabendazole as a synthetic bactericide.

Further, Japanese Patent Laid-Open No. 148407/1995 describes an antiviral filter comprising a filter material incorporated with a virus-inactivating agent comprising, as active ingredients, tea-extraction components. The tea-extraction components as referred to herein mean tea polyphenols, more specifically, epigallocatechin gallate, epicatechin gallate, epigallocatechin, epicatechin, etc. Further, an example of the filter material is polypropylene. In the examples of this patent publication, the polypropylene is mixed with 0.1% or more of the tea-extraction components, and the mixture is melt to form a film at from 200° C. to 250° C., which is then cut, fabricated into a non-woven fabric and formed into a filter.

However, in many cases, the antibacterial or deodorizing components originated from catechins are originally soluble in water or compatible with water. Accordingly, there is a problem that when a filter made from filaments having such an antibacterial or deodorizing component incorporated therein is washed with water, the antibacterial or deodorizing component elutes out, thereby impairing its effect.

That is, according to experiments made by the present inventors, it was found that, for example, in case where filaments obtained by incorporating a catechin in polypropylene, followed by melt forming, are used as a filter for air conditioners or air cleaners, although the filter exhibits good antimicrobial properties or deodorizing properties in the beginning, since the catechin is a water-soluble hydrophilic group-containing compound (in addition, the polypropylene is a polymer having no polarity), when the stained filter is dipped in water or washed with a synthetic detergent-containing water, a considerable amount of the incorporated catechin elutes out, thereby greatly lowering the antibacterial properties or deodorizing properties. Since the filter must be periodically washed, it is a great disadvantage that the active ingredient elutes out by the water washing.

In addition, when the antibacterial or deodorizing component is volatile at a certain temperature or higher, it is unavoidable that in a stage that such a component is incorporated in a resin material, followed by melt forming, a considerable amount of the relatively expensive antibacterial or deodorizing component volatilizes, resulting in loss in the quantity. Thus, when the amount of the antibacterial or deodorizing component to be compounded is increased, while expecting loss in the quantity due to the volatilization, not only the melt forming properties are lowered, but the resulting melt form is liable to be lowered in strength or surface roughening is caused.

Under such backgrounds, this invention is to provide a functional form ("Form" means molding article.), in which a functional component is hardly lost due to volatilization at melt forming, and the incorporated functional component such as a catechin is made water-resistant for fixing, so that the functional component does not readily elute out even after water washing, whereby functionalities such as antimicrobial properties or deodorizing properties can be kept over an extended period of time, as well as to provide a process for the production of the same.

SUMMARY OF THE INVENTION

The functional form according to the present invention comprises a melt form of a forming resin (Y) compounded with a functional component (a) having antimicrobial properties or deodorizing properties, selected from the group consisting of a catechin, a saponin, a tea-leaf powder, a tea-leaf extract, and tannin (tannic acid), and a ceramics component (b).

The process for the production of a functional form according to the present invention comprises melt forming a forming resin (Y) compounded with a functional component (a) having antimicrobial properties or deodorizing properties, selected from the group consisting of a catechin, a saponin, a tea-leaf powder, a tea-leaf extract, and tannin (tannic acid), and a ceramics component (b).

DETAILED DESCRIPTION OF THE INVENTION

The present invention is described below in detail.
(Functional component (a); ceramics component (b); and composite particles (X))
(Functional component (a))

First, the functional component (a) and the ceramics component (b) are explained. The functional component (a) and the ceramics component (b) are in a state of composite particles (X) where these components are compounded together. It is particularly preferred that the components (a) and (b) are compounded in a state of the composite particles (X) in the forming resin (Y).

As the functional component (a) as referred to herein is used at least one component having antimicrobial properties or deodorizing properties, selected from the group consisting of a catechin, a saponin, a tea-leaf powder, a tea-leaf extract, and tannin (tannic acid). The antimicrobial properties as referred to herein mean a concept including antibacterial properties, bacteriostatic properties, fungicidal properties, and antiviral properties.

As the catechin (including those belonging thereto) are used monomeric compounds and oligomeric compounds (including theaflavin). Those that are particularly important as the catechin are tea-originated catechin formulations in which the catechin concentration is increased. Major components of the tea catechin are epigallocatechin, epigallocatechin gallate, epicatechin, epicatechin gallate, etc. Since these components are not required to be isolated from each other, a formulation containing the tea catechin in a high concentration, comprising a mixture of these components (preferably those containing 20% or more of the tea catechin, and preferably, those containing 25% or more of the tea catechin), can be suitably used as it stands. The tea-originated catechin formulation is readily available because the commercially available tea-originated catechin formulation includes 30% products, 50% products, 60% products, 70% products, 80% products, and 90% products. The catechin is contained in various kinds of plants other than teas, such as catechu, and hence, catechins originated from such plants are also useful.

Among the saponins, tea saponin can be obtained by extracting a saponin-containing component with an organic solvent or water from tea leaves or tea seeds and then repeatedly purifying by means of column chromatography, etc. Though the teach saponin includes steroid saponin and triterepenoidsaponin, any of them can be used for the object of the invention. Since the saponin is also contained in various kinds of plants other than teas, such as ginseng (ginseng radix), panacis japonici rhizoma, soybean (Glycine max MERR.), bupleurum root (bupleuri radix), hydrangeae dulcis folium, loofah (*Luffa cylindrica M. Roemen*), polygala root (polygalae radix), platycodon root (platicodi radix). senega (senegae radix), ophiopogon tuber (ophiopogonis tuber), akebia stem (akebiae caulis), anemarrhena rhizome (anemarrhenae rhizoma), achyranthes root (achyranthis radix), licorice root (glycyrrhizae radix), and smilax rhizome (smilacis rhizoma), saponins made from these plants can also be used. However, from the standpoints of an easy availability and less impurities, the previously mentioned tea-originated tea saponin is particularly suitable.

Examples of the tea-leaf powder or tea-leaf extract which can be used include powders or extracts of teas, such as the first pick of tea, the second pick of tea, the third pick of tea, deeply steamed tea, and kabusecha.

As the tannin (tannic acid), commercially available purified tannic acid can be used. Extracts or semi-purified products of natural plants containing a large amount of tannic acid, such as Chinese gallotannin and Turkish gallotannin, can be used as they stand.

(Ceramics component (b))

As the ceramics component (b) various kinds of particulate ceramics are useful. A first example of the preferred ceramics component (b) is a combination of ceramics particles ($b_1$), an inorganic sintering aid ($b_2$) and an inorganic flocculant ($b_3$), or a combination of an inorganic sintering aid ($b_2$) and an inorganic flocculant ($b_3$).

Examples of the ceramics particles ($b_1$) include various clay minerals, oxides, hydroxides, composite oxides, nitrides, carbides, silicides, and borides. Also, zeolite, cristobalite, and diatomaceous earth are useful. Of these are important aluminum silicate, alumina, titania, silica, zirconia, magnesia, and aluminum hydroxide.

The ceramics particles ($b_1$) are preferably used in a state of particles as small as possible, i.e., fine or superfine particles having a particle size of 100 mesh or less (0.147 mm) and usually, 200 mesh or less (0.074 mm). In this case, it is also preferred to use a combination of two or more kinds of particles having a different mean particle size from each other.

Examples of the inorganic sintering aid ($b_2$) include polyvalent metal salts of an inorganic acid such as phosphoric acid, sulfuric acid, nitric acid, and carbonic acid. Of these are important polyvalent metal salts of phosphoric acid, such as aluminum phosphate, zinc phosphate, magnesium phosphate, manganese phosphate, and calcium phosphate, and especially, aluminum phosphate is preferred. They are usually put into use in a state where a hydrous salt or hydrate is dissolved in water. The inorganic sintering aid ($b_2$) is a component that plays a role to disperse the ceramics particles ($b_1$) during the mixing operation.

Suitable examples of the inorganic flocculant ($b_3$) include inorganic flocculants in a state of sol or solution and particularly, silicic anhydride in a state of sol or silicates (such as sodium silicate and potassium silicate) in a state of solution. The silicic anhydride in a state of sol includes not only usual colloidal silica that uses water as a medium but also an organosilica sol that uses an organic solvent such as an alcohol, as a medium. Besides, calcium aluminate and magnesium oxide are useful as the inorganic flocculant ($b_3$). The inorganic flocculant ($b_3$) plays a role as not only a flocculant but also a binder.

A second example of the preferred ceramics component (b) is a silica gel obtained via a hydrous silicic acid gel. At this time, an aqueous silicate solution is mixed with an acid to adjust the pH, thereby forming the hydrous silicic acid gel, which is then washed with water to remove ions, followed by drying to obtain the silica gel. Examples of the silicate include sodium silicate represented by $Na_2O.nSiO_2$ and potassium silicate represented by $K_2O.nSiO_2$. Particularly, the former sodium silicate is important. A highly concentrated aqueous solution of the silicate is generally called as a water glass. A typical commercially available water glass has an $SiO_2$ content of from about 22% to 38% by weight and an $Na_2O$ content of from about 5% to 19% by weight.

A third example of the preferred ceramics component (b) is a water-swelling clay mineral. As the water-swelling clay mineral, clay minerals having properties that are swollen upon absorption of water, such as sepiolite, vermiculite, and bentonite, as well as sericite clay and mica with a water-swelling grade, can be used. Of these is particularly important sepiolite having a peculiar fibrous structure. Other minerals are clay minerals having a stratiform structure.

The above-described sepiolite is hydrous magnesium silicate. Though the sepiolite is one kind of the clay mineral, it is a mineral having not a stratiform structure but a fibrous structure. Its color is white, gray or brown. The appearance of some of the sepiolite is in a mass-like, plate-like or clay-like state other than the fibrous state, but it is known that the sepiolite is microscopically an agglomerate of fibers. While an ideal chemical structure of the sepiolite is represented by:

$$Mg_8Si_{12}O_{30}(OH)_4(OH_2)_48H_2O$$

it is usual that a part of Si is substituted with Al and that a part of Mg is substituted with other metal. Major producing countries of the sepiolite are Spain, China, Turkey, USA, etc.

One example of characteristic values of the sepiolite is as follows. The true specific gravity is from about 2.0 to 2.3;

the Mohs hardness is from about 2.0 to 2.5; the length in the fibrous state is from about 0.2 to 2 μm; the width is from about 100 to 300 angstrom; the thickness is from about 50 to 100 angstrom; and the specific surface area determined by the BET-$N_2$ method is from about 200 to 380 $m^2/g$. However, these characteristic values vary depending upon the producing place or the concomitant minerals. For the object of the present invention, any products can be used regardless of the producing place or the concomitant minerals so far as they are high in the sepiolite content (for instance, 70% by weight or more).

(Composite particles (X))

The above-described functional component (a) and the ceramics component (b) are compounded in the forming resin (Y). In this case, though the functional component (a) and the ceramics component (b) are individually compounded, it is preferred that after the composite particles (X) in which the functional component (a) and the ceramics component (b) are compounded together have been previously produced, the composite particles (X) are compounded in the forming resin (Y).

It is particularly preferred that the composite particles (X) are produced by flocculating the ceramics component (b) in a state that the component (a) is contained. This is because such is advantageous from the points of view that the effect of an objective is durable and that the proportion of the functional component can be increased, as compared with a method in which the functional component (a) and the ceramics component (b) are merely individually compounded in the forming resin (Y), or a method in which the porous, particulate ceramics component (b) is dipped in thefunctional component (a), whereby functional component (a) is supported on the ceramics component (b).

In case where the composite particles (X) are produced, when the ceramics component (b) is a combination of the ceramics particles ($b_1$), the inorganic sintering aid ($b_2$) and the inorganic flocculant ($b_3$), it is typical that a mixture consisting the ceramics particles ($b_1$), the inorganic sintering aid ($b_2$), the functional component (a) and a medium is mixed with the inorganic flocculant ($b_3$) in a state of sol or solution, to form a flocculate, which is then subjected to heat treatment. At this time, it is desired that the ceramic particles ($b_1$) are first kneaded with an aqueous solution of the inorganic sintering aid ($b_2$), the functional component (a) is further mixed during, or before or after the kneading, and the inorganic flocculant ($b_3$) in a state of sol or solution is then mixed, followed by heat treatment.

At the mixing, when a suitable amount of a metal ion source that is used as a mordant for dyeing, such as copper salts, iron salts, calcium salts, titanium salts, aluminum salts, silver salts, tin salts, zinc salts, chromium salts, and cobalt salts, is present together with the functional component (a), such is more advantageous from the standpoints of making the functional component (a) resistant to water or fixing the functional component (a) when a form is produced not only in a case where the forming resin (Y) is a polar polymer such as nylon, but also in a case where the forming resin (Y) is a non-polar polymer such as polypropylene.

In a typical case, the ceramics particles ($b_1$) such as aluminum silicate, alumina and titania are added and kneaded with an aqueous solution of aluminum phosphate as one example of the inorganic sintering aid ($b_2$) such that the viscosity of the resulting mixture is in a degree of a thick paste, the mixture is further mixed with a powder of or an aqueous or alcoholic solution of the functional component (a) (or after mixing the functional component (a) with the ceramics particles ($b_1$), the mixture is kneaded with the inorganic sintering aid ($b_2$)), and if desired, an aqueous solution of aluminum phosphate is additionally mixed therewith to adjust the pH at from 3 to 4. Thereafter, a colloid solution of colloidal silica as one example of the inorganic flocculant ($b_3$) is mixed therewith to have the pH of the system to an approximately neutral degree, whereby flocculation occurs. After obtaining a flocculate, it is placed in a crucible or on an evaporating dish and then subjected to heat treatment by a dryer or an electric furnace until it becomes dehydrated.

With respect to the proportion of the respective components, the amount of the inorganic sintering aid ($b_2$) is one at which the inorganic sintering aid ($b_2$) fulfill it effect; the amount of the functional component (a) is an effective amount at which the functional component (a) can produce its effect (antimicrobial properties or deodorizing properties); and the amount of the inorganic flocculant ($b_3$) is one at which the inorganic flocculant ($b_3$) fulfill its effect. As a representative example which is though use in many cases, when the amount of the ceramics particles ($b_1$) is 100 parts by weight, the amount of the inorganic sintering aid ($b_2$) is from about 0.5 to 20 parts by weight (particularly, from about 1 to 20 parts by weight) in terms of the solid content; the amount of the functional component (a) is from about 1 to 130 parts by weight (particularly, from about 2 to 120 parts by weight) as a crude product; the amount of the inorganic flocculant ($b_3$) is from about 0.5 to 25 parts by weight (particularly, from about 1 to 20 parts by weight) in terms of the solid content; and the amount of the mordant (metal ion source) is from about 0 to 20% by weight (particularly, from about 0.1 to 10% by weight) against the functional component (a).

Since the solid is obtained by the heat treatment, the solid is usually crushed and if desired, classified to prepare the composite particles (X).

In case that the composite particles (X) are produced, when the ceramics component (b) is a combination of the inorganic sintering aid ($b_2$) and the inorganic flocculant ($b_3$), an aqueous solution of the inorganic sintering aid ($b_2$) such as aluminum phosphate is mixed with a powder of or an aqueous or alcoholic solution of the functional component (a) to adjust the pH at from 3 to 4, and a colloid solution of the inorganic flocculant ($b_3$) such as colloidal silica is further mixed with the mixture to have the pH of the system to an approximately neutral degree, whereby flocculation occurs. Then, the flocculate is placed in a crucible or on an evaporating dish and then subjected to heat treatment by a dryer or an electric furnace until it becomes dehydrated.

With respect to the proportion of the respective components, the amount of the inorganic flocculant ($b_3$) is, in many cases, from about 100 to 300 parts by weight or even more, in terms of the solids content based on 100 parts by weight of the solids content of the inorganic sintering aid ($b_2$). Though the amount of the functional component (a) is an effective amount at which the functional component (a) can produce its effect (antimicrobial properties or deodorizing properties), the amount of the functional component (a) is, in many cases, from about 1 to 130 parts by weight (particularly, from about 2 to 120 parts by weight) as a crude product based on 100 parts by weight of the sum of the inorganic sintering aid ($b_2$) and the inorganic flocculant ($b_3$).

In case that the composite particles (X) are produced, when the ceramics component (b) is a silica gel obtained via a hydrous silicic acid gel, it is desired that the functional component (a) is added to the system before, during or after mixing the silicate and the acid but before the completion of the gelation reaction, thereby containing the functional component (a) in the silica gel to prepare the composite particles (X).

With respect to the proportion of the respective components, the amount of the functional component (a) is an effective amount at which the functional component (a) can produce its effect (antimicrobial properties or deodorizing properties), but in many cases, the amount of the functional component (a) is from about 1 to 130 parts by weight (particularly, from about 2 to 120 parts by weight) as a crude product based on 100 parts by weight of the ceramics component (b).

In case that the composite particles (X) are produced, when the ceramics component (b) is a water-swelling clay mineral, in order to support the functional component (a) on the ceramics component (b) the both components are contacted with each other in the presence of a medium such as water or an organic solvent.

In many cases, the amount of the functional component (a) to be supported is from about 1 to 130 parts by weight (particularly, from about 2 to 120 parts by weight) based on 100 parts by weight of the water-swelling clay mineral.

(Forming resin (Y))

As the forming resin (Y) are useful various kinds of resins that can be subjected to melt forming, such as polyethylene, polypropylene, ethylene-vinyl acetate copolymer, other polyolefins such as ionomer, nylons (such as nylon 6, nylon 66, nylon 6-66, nylon 610, nylon 612, nylon 11, nylon 12, and nylon 46), polyesters (such as polyethylene terephthalate, polybutylene terephthalate, and copolymerized polyesters), acrylic polymers, polyvinyl chloride, polyvinylidene chloride, polystyrene, ABS resin, AS resin, polycarbonates, polyacetals, ethylene-vinyl alcohol copolymer, various thermoplastic elastomers, and cellulosic polymers. These resins can be used in admixture of two or more thereof. Of these are particularly important polyolefins, nylons and polyesters.

(Functional form)

The desired functional form is obtained by compounding (namely, internally adding or incorporating) the functional component (a) and the ceramics component (b) (particularly, the composite particles (X) made of them) with the forming resin (Y), followed by melt forming.

The melt forming that can be used includes extrusion forming, injection forming, compression forming, calender forming, and extrusion coating. The forming temperature is a temperature at which the forming resin (Y) is molten, or higher. In the melt forming, for smooth forming properties as well as uniform dispersibility of the functional component (a) and the ceramics component (b) (particularly, the composite particles (X) made of them) in the resin phase, it is preferable to use a method in which the functional component (a) and the ceramics component (b) (particularly, the composite particles (X)) are previously mixed with the forming resin (Y), the mixture is then melt extruded and palletized to prepare a master batch in which the amounts of the functional component (a) and the ceramics component (b) (particularly, the composite particles (X)) to be compounded with the forming resin (Y) are high against the amount of the forming resin (Y), and a suitable amount of the master batch is then compounded with the forming resin (Y) in a pellet state, followed by providing for melt forming, to adjust the concentration.

Suitably, the sum of the functional component (a) and the ceramics component (b) (particularly, the composite particles (X) made of them) to be compounded is from 0.1 to 30 parts by weight, preferably from 0.5 to 20 parts by weight, and also preferably from 1 to 15 parts by weight, based on 100 parts by weight of the forming resin (Y). When the amounts of the functional component (a) and the ceramics component (b) (particularly, the composite particles (X) made of them) to be compounded are too small, the desired functional form having antimicrobial properties or deodorizing properties cannot be obtained. On the other hand, when the compounding amounts of the components (a) and (b) are too large, the forming properties are impaired, so that even when the forming could be made, the resulting form is insufficient in strength.

In the melt forming, if desired, stabilizers, antioxidants, ultraviolet light absorbers, plasticizers, lubricants, reinforcing materials (short fibers, etc.), fillers, colorants, fluidity improvers, releasants, flame retardants, and the like can be suitably compounded. Besides, extracts of crude drugs can also be compounded.

As the shape of the functional form, shapes of, for example, filament, film (including sheets and coatings), net, pipe, rod, vessel, and various parts can be arbitrarily used. The resulting form can also be offered for secondary processing such as stretching, splitting, vacuum forming, and deep drawing. In the case of the functional form being filament, yarns, ropes, cotton, nets, non-woven fabrics, woven fabrics, knitted fabrics, belts, and the like can be produced by using it.

(Use)

The functional form according to the present invention has good antimicrobial properties or deodorizing properties, and even after it has been subjected to water washing or laundering, or used such that it comes into contact with water or rain water, its functionalities can be kept over a long period of time. Accordingly, the functional form according to the present invention is useful as a filter for instruments such as air conditioners, air cleaners, and vacuum cleaners. Also, it is useful for various applications such as garments, bedding-related materials, hygienic materials, footwear materials, matting materials, kitchen utensils, toiletry goods, personal belongings, tent cloths, hoses, filtering cloths, interior materials of buildings or vehicles, building materials, medical materials, agricultural or horticultural materials, and packaging materials.

(Effects)

The functional form according to the present invention is one obtained by melt forming the forming resin (Y) compounded with the functional component (a) and the ceramics component (b) (particularly, the composite particles (X) made therefrom). Since in this functional form, the functional component (a) such as catechins is present together with the ceramics component (b) (preferably as the composite particles (X)) and made water-resistant for fixing, even when the functional form is used for the application where it comes into contact with water, e.g., water washing, the functional component (a) does not readily elute out, so that the functionalities such as antimicrobial properties or deodorizing properties are kept over a long period of time.

Further, since a component selected from the group consisting of a catechin, a saponin, a tea-leaf powder, a tea-leaf extract, and tannin (tannic acid) is used as the functional component (a), not only desired antimicrobial properties and/or deodorizing properties are produced, but also antiallergic properties or resistance to oxidation can be obtained, and its safety is high.

Moreover, even when the functional component (a) has properties such that it is volatile at a certain temperature or higher, it is present together with the ceramics component (b) (preferably, compounded together). Accordingly, when the components (a) and (b) are compounded in the forming resin (Y) and then provided for melt forming, the functional component (a) is hardly lost due to the volatilization, and hence, the functional form of the present invention is in ensuring the melt forming properties and of saving the relatively expensive functional component (a). In addition, the presence of the ceramics component (b) has an advantage that it contributes to an improvement of resistance of the form (improvements in dimensional stability or heat resistance) to environmental changes such as changes in temperature and relative humidity.

EXAMPLES

The present invention will now be described in more detail with reference to the following Examples, but it is not to be construed that the present invention is limited thereto. In these Examples, all parts and percentages are on a weight basis.

Examples 1 to 8
(Production method 1 of composite particles (X))

As the functional component (a), a 30% product of tea catechin (a catechin formulation originated from tea, containing about 30% in total of epigallocatechin, epigallocatechin gallate, epicatechin and epicatechin gallate), tea saponin having a purity of 70%, a powder obtained by drying a hot water-extract of green tea, a green tea powder, and tannic acid having a purity of 85% were prepared.

As the ceramics particles ($b_1$), 400 parts of alumina having a particle size of 250 mesh (0.061 mm) or less and 100 parts of alumina having a particle size of 325 mesh (0.043 mm) or less were dried for mixture. The mixture was then kneaded a little hard, while adding thereto 100 parts of an aqueous aluminum phosphate solution having a concentration of 20% as one example of the inorganic sintering aid ($b_2$), to obtain a paste.

The whole of the kneaded paste was charged in an automatic porcelain mortar and added with a solution of 215 parts (as a crude product) of the functional component (a) dissolved in a suitable amount of isopropanol, and the mixture was kneaded until it became a slurry. After confirming that the pH was from about 3 to 4, the slurry was added and mixed with 37.5 parts of a colloid solution of colloidal silica (a solid content of 40%) as one example of the inorganic flocculant ($b_3$), to obtain the neutral pH. Since the slurry was gradually flocculated, it was moved on an evaporating dish (or in a crucible) while handling could be effected, and heated in a thermostat dryer or an electric furnace, followed by dehydration at from 100° C. to 300° C. and hydrolysis.

There was thus obtained a hard, amorphous composite flocculate, which was then pulverized in an automatic mortar (or a ball mill) and classified by means of a sieve to obtain a product having a particle size of from 100 to 325 mesh. The resulting particles of the composite flocculate were subjected to heat treatment in a thermostat or an electric furnace at 100° C. for 3 hours, to obtain the composite particles (X) having the functional component (a) and the ceramics component (b) compounded together. A proportion of the functional component (a) accounting in the composite particles (X) is 28.7% as a theoretical amount.
(Production method 2 of composite particles (X))

The same procedures as in the production method 1 as described above were followed, except using 500 parts of titania particles having a 400-mesh size as the ceramic particles ($b_1$), to prepare the composite particles (X).
(Production method 3 of composite particles (X))

Aluminum silicate (400 parts) having a mean particle size of 325 mesh or less as the ceramic particles ($b_1$) and 130 parts of a 30% product of tea catechin as the functional component (a) were dried for mixture. The mixture was then kneaded a little hard, while adding thereto 200 parts of an aqueous aluminum phosphate solution having a concentration of 25% as one example of the inorganic sintering aid ($b_2$), and further, 7 parts of copper sulfate was simultaneously added dropwise thereto in a state that it was dissolved in the above-described aqueous aluminum phosphate solution, to obtain a paste. The paste was mixed with 50 parts of a colloid solution of colloidal silica (a solids content of 40%) as one example of the inorganic flocculant ($b_3$), to obtain the pH neutral. At this time, flocculation gradually took place, and therefore, the mixture was moved in a crucible while handling could be effected. After drying, the resulting mixture was subjected to dehydration at from 100° C. to 300° C. and hydrolysis. The hydrolyzate was pulverized to obtain the composite particles (X). A proportion of the functional component (a) in the composite particles (X) is 21.4% as a theoretical amount.
(Production method 4 of composite particles (X))

To a 1N sulfuric acid solution kept at 0° C. was added a product of 30% tea catechin as the functional component (a). Separately, a 1N water glass No. 3 solution was prepared. Thereafter, the 1N water glass solution was added dropwise to the 1N sulfuric acid solution containing the functional component (a) over several minutes, while vigorously stirring. At this time, the temperature of the reaction mixture was from 5° C. to 7° C. The mixture was washed with running water for one day. After removing the water well, the resulting mixture was finely crushed and vacuum dried in a dryer at a temperature of from 50° C. to 60° C., to obtain the composite particles (X) in a state of powder. A proportion of the functional component (a) in the composite particles (X) was adjusted to be 22.0%.
(Functional form)

First, 50 parts of the thus obtained composite particles (X) were compounded in 50 parts of polypropylene or 6-nylon as one example of the forming resin (Y), to obtain a master batch.

Next, 16 parts of the master batch was mixed with 84 parts of pellets of polypropylene or 6-nylon as one example of the forming resin (Y), followed by melt forming to obtain a functional form in a state of monofilament. Then, using this monofilament, a front filter for an air conditioner or air cleaner was prepared. In this case, a proportion of the functional monomer (a) (as a crude product) in the total of the forming resin (Y) and the composite particles (X) is 2.30% for Examples 1 to 5 and 7, 1.71% for Example 6 and 1.76% for Example 8, respectively on a basis at the time of compounding.

Comparative Examples 1 to 2

The above-described functional component (a) was compounded in a proportion of 2.30% directly in polypropylene, followed by melt forming to form a monofilament. Then, using this monofilament, a filter was prepared.
(Summary of conditions)

The conditions are shown in Table 1. In the table, the abbreviations used are as follows. PP: polypropylene, Ny: 6-nylon, Cat: a product 30% of catechin, Sap: saponin having a purity of 70%, Ext: a dry powder of hot water-extract of tea-leaf, Pow: a green tea powder. Tan: tannic acid having a purity of 85%, Al: alumina, Ti: titania, AlSi: aluminum silicate, Si: silica gel.

TABLE 1

|  | Example | | | | | | | | Comparative Example | |
|---|---|---|---|---|---|---|---|---|---|---|
|  | 1 | 2 | 3 | 4 | 5 | 6 | 7 | 8 | 1 | 2 |
| Production method of (X) | 1 | 1 | 1 | 1 | 1 | 3 | 2 | 4 | - | - |
| (a) in (X) | Cat | Sap | Ext | Pow | Tan | Cat | Cat | Cat | Cat | Sap |
| ($b_1$) in (X) | Al | Al | Al | Al | Al | AlSi | Ti | Si | — | — |
| (Y) | PP | PP | PP | Ny | Ny | PP | PP | PP | PP | PP |

Note (X): composite particles, (a): functional component, ($b_1$): ceramics particles, (Y): forming resin (Test)

Each of the filters prepared in Examples 1, 2, 6, 7 and 8 and Comparative Examples 1 and 2 was washed with water under the conditions as described below, and the amounts of the functional component (a) before and after the water washing were measured by thermal analysis by means of a differential calorimeter (the temperature was elevated at a rate of 5° C./min in an electric furnace, and a heat balance (endothermic heat/exothermic heat) of the sample during the heating step and an accompanying increase or decrease in weight were analyzed). And, the filters before and after the water washing were subjected to the deodorizing properties test and the antibacterial properties test under the following conditions. The results obtained are shown in Table 2.

(Water washing conditions)

The filter was dipped in a 0.5% aqueous solution of a domestic synthetic detergent (at a temperature of 40° C.) for 15 minutes. Thereafter, an operation for rubbing and washing the surface by a sponge several times and drying in the shade was repeated five times.

(Deodorizing properties test)

In a 1-$m^3$ vessel were placed an air cleaner capable of being operated externally and a filter, and five cigarettes were installed in a smoke absorber and ignited in the vessel. When the first cigarette had burnt out, the smoke absorber was stopped, and when the last cigarettes burnt out, the operation of the air cleaner was started. An ammonia concentration was measured by using a gas detector tube 5 minutes and 30 minutes after the start of the operation. Then, a deodorizing rate was determined by how the concentration was decreased after 30 minutes, as compared with the concentration (initial concentration) after 5 minutes.

(Antibacterial properties test)

Each sample was examined for the antibacterial properties under the following conditions.

Test item: Test for rate of decrease in of the number of bacteria

Test method: According to uniform test method (a provisional name)

Test results:

Number of planted bacteria (A):
$1.0 \times 10^5$ log A=5.0

Number of bacteria on non-processed cloth (B):
$1.6 \times 10^7$ log B=7.2

(A standard cotton cloth was used as the non-processed cloth.)

log B−log A=2.2>1.5 (The test was effective) Increase or decrease value=log C−log A Difference in increase or decrease value=(log B−log A)−(log C−log A)

TABLE 2

|  | Example | | | | | Comparative Example | |
|---|---|---|---|---|---|---|---|
|  | 1 | 2 | 6 | 7 | 8 | 1 | 2 |
| Before water washing | | | | | | | |
| Content of (a) (%) | 2.2 | 2.2 | 1.6 | 2.2 | 1.7 | 1.8 | 1.7 |
| Deodorizing rate of $NH_3$ (%) | 72 | 68 | 77 | 70 | 73 | 62 | 63 |
| Antibacterial properties | | | | | | | |
| Number of bacteria, log C | 3.8 | 4.2 | 3.8 | 3.9 | 3.9 | 4.1 | 4.1 |
| Increase or decrease value | −1.2 | −0.8 | −1.2 | −1.1 | −1.1 | −0.9 | −0.9 |
| Difference in increase or decrease value | 3.4 | 3.0 | 3.4 | 3.3 | 3.3 | 3.1 | 3.1 |
| After water washing five times | | | | | | | |
| Content of (a) (%) | 1.9 | 2.0 | 1.4 | 1.9 | 1.5 | 0.2 | 0.1 |
| Deodorizing rate of $NH_3$ (%) | 69 | 63 | 74 | 65 | 66 | 7 | 5 |
| Antibacterial properties | | | | | | | |
| Number of bacteria, log C | 4.0 | 4.3 | 3.9 | 4.0 | 4.1 | 7.0 | 7.1 |
| Increase or decrease value | −1.0 | −0.7 | −1.1 | −1.0 | −0.9 | 2.0 | 2.1 |
| Difference in increase or decrease value | 3.2 | 2.9 | 3.3 | 3.2 | 3.1 | 0.2 | 0.1 |

(For the antibacterial properties test, 0.2 g of the sample was collected.)

While the details regarding the filters of Examples 3 to 5 are omitted, the amounts of the functional component (a) before and after the water washing were as follows.

Example 3: 2.2%→2.0%

Example 4: 2.2%→2.0%

Example 5: 2.2%→1.9%

In Comparative Examples 1 to 2, a fact that the content of the functional component (a) before the water washing was lower than that in the corresponding Examples is considered to be caused by a larger amount of a part of the functional component (a) that was lost due to the volatilization during the melt forming. And, in Comparative Examples 1 to 2, it is understood that after the water washing five times, a major part of the functional component (a) eluted out, whereby the deodorizing properties or the antibacterial properties were markedly lowered.

Examples 9 to 13

(Production method 5 of composite particles (X))

As the functional component (a), a product of 30% tea catechin, tea saponin having a purity of 70%, and a powder obtained by drying a hot water-extract of green tea were prepared.

The functional component (a) was mixed with 200 parts of an aqueous aluminum phosphate solution having a concentration of 25% as one example of the inorganic sintering aid ($b_2$), to adjust the pH at from 3 to 4. Then, the mixture was further mixed with 130 parts of a colloid solution of colloidal silica (solids content of 40%) as one example of the inorganic flocculant ($b_2$), to obtain the neutral pH. Since the slurry was gradually flocculated, it was moved on an evaporating dish (or in a crucible) while handling could be effected, and heated in a thermostat dryer or an electric furnace and subjected to heat treatment for drying at from 100° C. to 300° C. There was thus obtained a hard, amorphous composite flocculate, which was then pulverized in an automatic mortar (or a ball mill) and classified by means of a sieve to obtain a product having a particle size of from 100 to 325 mesh. The resulting particles of the composite flocculate were subjected to heat treatment in a thermostat or an electric furnace at 100° C. for 3 hours, to obtain the composite particles (X).

(Functional form)

First, 50 parts of the thus obtained composite particles (X) were compounded in 50 parts of polypropylene, 6-nylon or a polyester (polyethylene terephthalate) as one example of the forming resin (Y), to obtain a master batch.

Next, 16 parts of the master batch was mixed with 84 parts of pellets of polypropylene, 6-nylon or a polyester (polyethylene terephthalate) as one example of the forming resin (Y), followed by melt forming to obtain a functional form in a state of monofilament. Then, using this monofilament, a front filter for an air conditioner or air cleaner was prepared. In this case, a proportion of the functional monomer (a) (as a crude product) in the total of the forming resin (Y) and the composite particles (X) was adjusted to be 2.30% for all of Examples 9 to 13 on a basis at the time of compounding.

Comparative Examples 3 to 4

The above-described functional component (a) was compounded in a proportion of 2.30% directly in polypropylene or 6-nylon, followed by melt forming to form a monofilament. Then, using this monofilament, a filter was prepared.

(Conditions and results)

These filters were subjected to the same tests as described above, and the amounts of the functional component (a) before and after the water washing in each of the filters of Examples 9 to 13 and Comparative Examples 1 to 2 were measured. Incidentally, the antibacterial properties and the deodorizing properties in Examples 9 to 13 were substantially equal to those in Examples 1, 2 and 7; and the antibacterial properties and the deodorizing properties in Comparative Examples 3 to 4 were substantially equal to those in Comparative Examples 1 to 2.

The conditions and results are shown in Table 3. In the table, the abbreviations are as follows. PP: polypropylene, Ny: 6-nylon, PET: polyester, Cat: a product of 30% catechin, Sap: saponin having a purity of 70%, Ext: a dry powder of hot water-extract of tea-leaf.

TABLE 3

|  | Example | | | | | Comparative Example | |
| --- | --- | --- | --- | --- | --- | --- | --- |
|  | 9 | 10 | 11 | 12 | 13 | 3 | 4 |
| Production method of (X) | 5 | 5 | 5 | 5 | 5 | — | — |
| (a) in (X) | Cat | Sap | Ext | Cat | Sap | Cat | Sap |
| (Y) | PP | PP | Ny | PET | PET | PP | PET |
| Amount of (a) (%) |  |  |  |  |  |  |  |
| Before water washing | 2.2 | 2.2 | 2.2 | 2.1 | 2.0 | 1.8 | 1.7 |
| After water washing | 2.0 | 2.0 | 1.9 | 1.9 | 1.8 | 0.2 | 0.3 |

(Note) (X): composite particles, (a): functional component, (Y): forming resin

Examples 14 to 15 & Comparative Example 5 to 6

(Composite particles (X) & functional form)

As the functional component (a), the following were prepared.

(Cat): a product 30% of tea catechin
(Sap): tea saponin having a purity of 70%
(Ext): a dry powder of hot water-extract of tea-leaf As the water-swelling clay mineral the following were prepared as one example of the ceramics component (b).

(Sep): a sepiolite powder made in Spain, having a particle size of 325 mesh or less
(Ver): a commercially available vermiculite powder
(Ben): a commercially available bentonite powder The functional component (a) was dissolved or dispersed in water and then mixed with the water-swelling clay mineral, followed by drying. There was thus obtained the powdered composite particles (X) having a prescribed amount of the functional component (a) supported on the water-swelling clay mineral, which was then subjected to the following antimicrobial properties test for reference.

(Antimicrobial properties test)

With respect to the composite particles (X) as obtained above, the antibacterial properties against *Staphylococcus aureus*, ATCC 6538P were examined according to the uniform testing method manual (the test for rate of decrease in the number of bacteria). More specifically, a bouillon suspension of the tested bacteria was poured on a sterilized cloth, and after cultivation in a sealed vessel at 37° C. for 18 hours, the number of alive bacteria was measured, to obtain an increase or decrease value against the number of planted bacteria. The weight of the sample to be collected was 0.2 g. The results obtained are shown below as well as in Table 4. Incidentally, a standard cloth was used as the non-processed cloth. An index of the bacteriostatic active value is 2,2 or more against *Staphylococcus aureus*.

Number of planted bacteria (A): $1.9 \times 10^4$ log A=4.3

Number of bacteria on non-processed cloth (B): $1.3 \times 10^7$ log B=7.1 log B−log A=2.8>1.5 (The test was effective.)

Biocidal active value=log A−log C

Bacteriostatic active value=log B−log C

TABLE 4

|  | Composite particles (X) | | Number of bacteria log C | Biocidal active value log A − log B | Bacteriostatic active value log B − log C |
| --- | --- | --- | --- | --- | --- |
|  | (b) | (a) |  |  |  |
| No. 1 | (Cat) 50% | (Sep) 50% | 2.3 | 2.0 | 4.8 |
| No. 2 | (Sap) 50% | (Sep) 50% | 2.3 | 2.0 | 4.8 |
| No. 3 | (Ext) 50% | (Sep) 50% | 2.3 | 2.0 | 4.8 |
| No. 4 | (Cat) 50% | (Ver) 50% | 4.0 | 0.3 | 3.1 |
| No. 5 | (Cat) 50% | (Ben) 50% | 3.8 | 0.5 | 3.3 |
| No. 1' | — | (Sep) 100% | 5.7 | −1.4 | 1.4 |
| No. 2' | — | (Ver) 100% | 6.9 | −2.6 | 0.2 |
| No. 3' | — | (Ben) 100% | 6.6 | −2.3 | 0.5 |

It can be understood from Table 4 that though the sepiolite alone has bacteriostatic properties slightly, it does not have biocidal properties. And, in the composite particles (X) having the functional component (a) supported on the water-swelling clay mineral, when the water-swelling clay mineral as one example of the ceramics component (b) is sepiolite (Sep), not only the bacteriostatic properties are markedly superior, but also the biocidal properties are realized. Further, when the water-swelling clay mineral is vermiculite (Ver) or bentonite (Ben), the bacteriostatic properties are good, though they are not so effective as compared with those in the case in which the sepiolite is used.

Of the composite particles (X), since the water-swelling clay mineral has an adsorbing function of odoriferous components, etc., a binding function, a thickening function, and a thixotropic function, not only it is liable to support the functional component (a) thereon, but also when used upon contact with water, it has a function such that the functional component (a) is hardly released, and exhibits properties such as gradual release properties, water resistance, and laundry resistance. In particular, when the sepiolite that is a water-swelling clay mineral having a fibrous state is used, the effects are remarkable.

Since the effects of the composite particles (X) could be confirmed as described above, a master batch was first prepared by compounding 80 parts of pellets of polypropylene were compounded with 20 parts of the composite particles (X) having the functional component in which the catechin purity of the product of 30% tea catechin (Cat) was increased to 60%, supported on the sepiolite (Sep) powder in a weight ratio of 1:1. Next, 20 parts of this master batch was mixed with 80 parts of pellets of polypropylene, and the mixture was melt extruded to obtain a form in a state of monofilament. Then, by using this monofilament, a net (a front filter for air conditioners) was prepared. There was thus obtained a net-like functional form comprising the composite particles (X) internally added to polypropylene as one example of the forming resin (Y) by the internal addition method (incorporation method) (Example 14). The same procedures were followed with respect to 6-nylon in place of the polypropylene (Example 15).

For comparison, a monofilament was formed by compounding 2 parts of a product of 60% tea catechin (Cat) in 98 parts of each of polypropylene and 6-nylon. Then, nets were prepared
(Comparative Example 5 and Comparative Example 6).

Each of the nets was dipped in a vessel charged with tap water at 60° C. in such a manner that the net sank under the water, and the water was stirred with a magnetic stirrer. Four days after dipping in water in this state, the sample taken out was subjected to partial sampling to measure the degree of elution. The determination of the quantity of catechin was carried out by differential calorimetry. As a result, in Comparative Examples 5 and 6, a major part of the incorporated product of 60% catechin (Cat) eluted out, and the residual rate of catechin as the active ingredient was at substantially zero. On the other hand, in Examples 14 and 15, the residual rate of catechin was confirmed to be from 60 to 70%.

Examples 16 to 18

In the formulations of Examples 1 to 3, films having a thickness of 30 μm were produced by extrusion forming.

Each of the film thus obtained was slit into a width of 2 mm to obtain slit yarns. By using the slit yarns, a woven fabric was prepared. The thus prepared woven fabric was subjected to the same tests as in Examples 1 to 3. As a result, the same deodorizing properties or antibacterial properties as in Examples 1 to 3 were obtained. Also, the decrease in the quantity of catechin before and after the water washing was thoroughly prohibited.

What is claimed is:

1. A functional form comprising a melt form of a forming resin (Y) compounded with a functional component (a) having antimicrobial properties or deodorizing properties, selected from the group consisting of acatechin, a saponin, a tea-leaf powder, a tea-leaf extract, and tannin (tannic acid), and a ceramics component (b).

2. A functional form as claimed in claim 1, wherein the functional component (a) and the ceramics component (b) are compounded in a state of composite particles (X) made of the components in the forming resin (Y).

3. A functional form as claimed in claim 2, wherein the composite particles (X) are particles of a composite agglomerate in which the ceramics component (b) is flocculated in a state that the component (a) is contained.

4. A functional form as claimed in any one of claims 1 to 3, wherein the ceramics component (b) is a combination of ceramic particles ($b_1$), an inorganic sintering aid ($b_2$) and an inorganic flocculant ($b_3$), a combination of an inorganic sintering aid ($b_2$) and an inorganic flocculant ($b_3$), a silica gel obtained via a hydrous silicic acid gel, or a water-swelling clay mineral.

5. A functional form as claimed in claim 1, wherein the shape of the melt form is in a state of filament or film.

6. A process for the production of a functional form, comprising melt forming a forming resin (Y) compounded with a functional component (a) having antimicrobial properties or deodorizing properties, selected from the group consisting of a catechin, a saponin, a tea-leaf powder, a tea-leaf extract, and tannin (tannic acid), and a ceramics component (b).

7. A process as claimed in claim 6, wherein the functional component (a) and the ceramics component (b) are compounded in a state of composite particles (X) made of the components in the forming resin (Y).

* * * * *